United States Patent Office 3,310,680
Patented Mar. 21, 1967

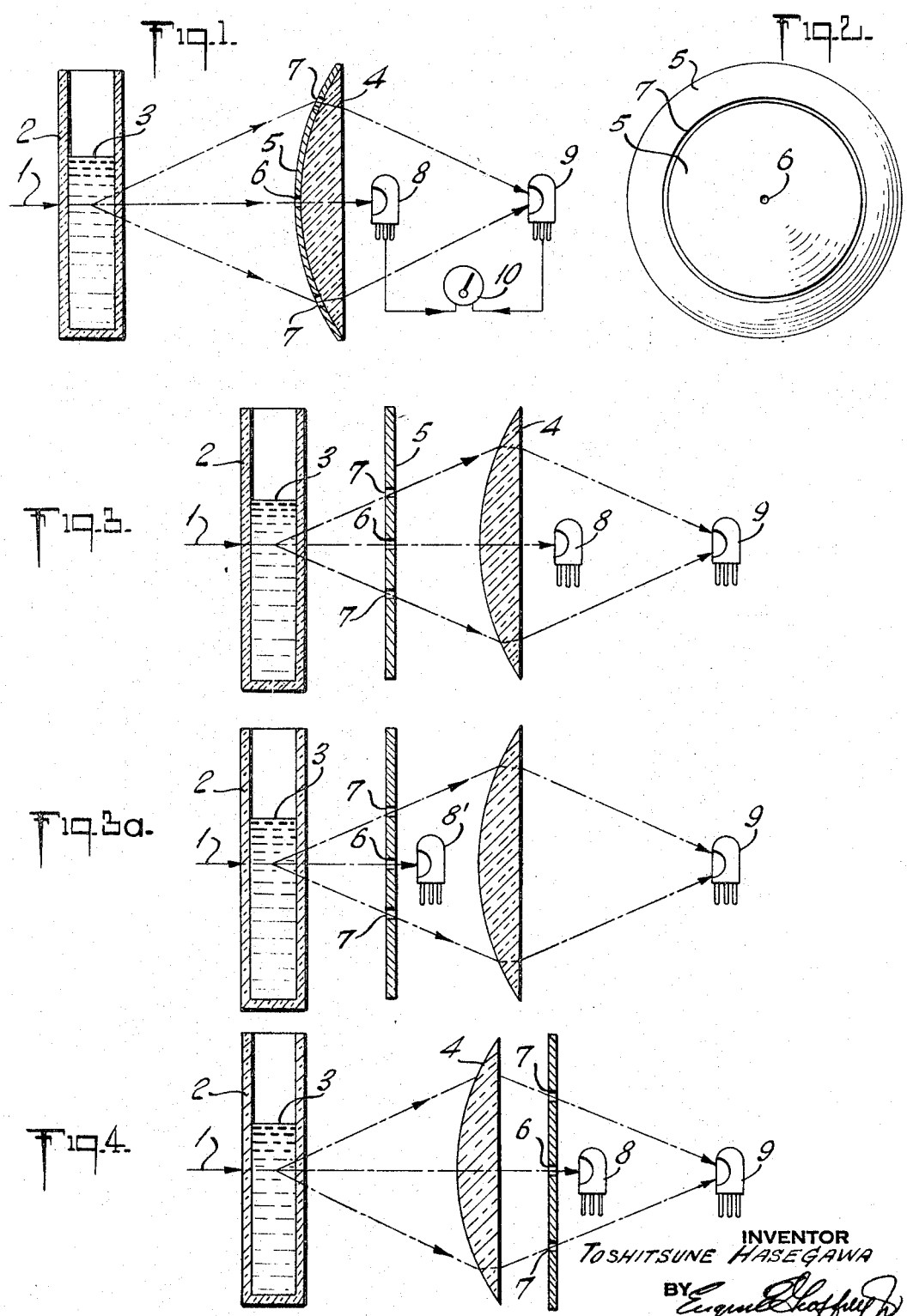

3,310,680
PHOTOSENSITIVE CONCENTRATION MEASURING APPARATUS FOR COLLOIDAL SOLUTIONS
Toshitsune Hasegawa, 12 Tsukiwaka-cho, Ashiya-shi, Hyogo-ken, Japan
Filed Mar. 6, 1964, Ser. No. 350,068
1 Claim. (Cl. 250—218)

This invention relates to an apparatus for measuring the concentration of a colloidal solution according to the scattering degree of a light within said solution.

Objects and advantages of the invention will be set forth in part hereinafter and in part will be obvious herefrom, or may be learned by practice with the invention, the same being realized and attained by means of the instrumentalities and combinations pointed out in the appended claim.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

In the drawings:

FIGURE 1 shows a side view of an example of the embodiment of this invention, and FIGURE 2 shows a front view of the focusing lens used in said embodiment.

FIGURES 3 and 3a show the side views of other examples of embodiments of this invention.

FIGURE 4 is a side view of still another embodiment of the invention.

According to this invention, a thin beam 1 of the ray produced by a proper ray source is irradiated to the colloidal solution 3 within a sample tank 2 made of such material as glass. A ray shielding layer 5 is formed on the surface of a lens 4 which is provided in the rear of the sample tank 2, and at the center portion of the ray shielding layer 5, a small circular hole 6 having substantially the same diameter as that of the beam 1 and a ring shaped thin slit 7 concentrically surrounding said holes 6 are provided. Such a light sensitive element 8 as a phototransistor is provided on the axis of said ray in the rear of the lens 4, a similar light sensitive element 9 is provided also at the imaging position of the solution 3, and the outputs of these light sensitive elements 8 and 9 are given to a ratio meter 10 after being amplified if necessary. As the ratio meter 10, any suitable device can be used such as potentiometer type or wattmeter type.

In the above mentioned apparatus, when a colloid is not contained at all in the solution within the sample tank 2, the beam 1 travels straight as it is, it comes into the light sensitive element 8 permeating through the small circular hole 6 but does not come into the light sensitive element 9 because it does not receive any scattering at all, and, accordingly, an output appears in the light sensitive element 8 but does not appear in the light sensitive element 9.

On the other hand, if a colloid is contained in the solution, the beam 1 receives scattering, a portion of the scattered ray is focused by the lens 4 after it passed through the slit 7, and comes into the light sensitive element 9. Accordingly an output appears in the light sensitive element 9, and, at the same time, the output of the light sensitive element 8 decreases. The ratio of the outputs of the light sensitive elements 8 and 9 at this time corresponds to the concentration of the colloidal solution in so far as the kind of colloid is constant.

According to the invention, therefore, even when the ray intensity of the beam 1 varies due to variation of the power source voltage or even if the sensitivity of the light sensitive elements 8 and 9 varies the ratio meter always correctly indicates the colloidal concentration, and the advantage is that said indication has nothing to do with the color of medium of the solution and its absorbing rate.

The ray shielding layer 5 may be spaced from the surface of the lens 4 as is shown in FIGURE 3 and may be provided in front of the lens 4 or it may be provided in the rear of the lens 4 as is shown in FIGURE 4. In case the ray shielding layer 5 is arranged in front of the lens 4 as is shown in FIGURE 3, the light sensitive element 8 may be positioned in the middle of the ray shielding layer 5 and the lens 4 as illustrated at 8' in FIGURE 3a.

While only certain embodiments of this invention have been illustrated and described, it is apparent that alterations, modifications and changes may be made without departing from the true scope and spirit thereof as defined by the appended claim.

What is claimed is:

Colloidal solution concentration measuring apparatus comprising a light ray source for producing a thin ray beam, a transparent sample tank being provided in the traveling path of said beam and containing a colloidal solution, a ray shielding layer being provided to the rear of said sample tank and having a small hole in the traveling path of said beam and a slit concentrically surrounding said small hole, a focusing lens provided to the rear of said sample tank, a first light sensitive element provided to the rear of the small hole of said ray shielding layer, a second light sensitive element provided at a position at which said lens images said colloidal solution, and a ratio meter connected with said light sensitive elements and indicating the ratio of the output signals produced by said first and second light sensitive elements.

References Cited by the Examiner

UNITED STATES PATENTS

| | | | |
|---|---|---|---|
| 2,980,802 | 4/1961 | Bracey et al. | 250—218 |
| 3,045,530 | 7/1962 | Tsujiuchi | 88—57 |
| 3,098,934 | 7/1963 | Wilson et al. | 250—203 |
| 3,138,650 | 6/1964 | Andrychuk | 88—14 |
| 3,248,551 | 4/1966 | Frommer | 250—216 |

RALPH G. NILSON, *Primary Examiner.*

WALTER STOLWEIN, *Examiner.*